Dec. 5, 1967  J. ELBLING  3,356,994
POSITIONING NUMERICAL CONTROL DEVICE FOR
MACHINE TOOLS AND SIMILAR EQUIPMENTS
Filed Oct. 2, 1964
10 Sheets-Sheet 2

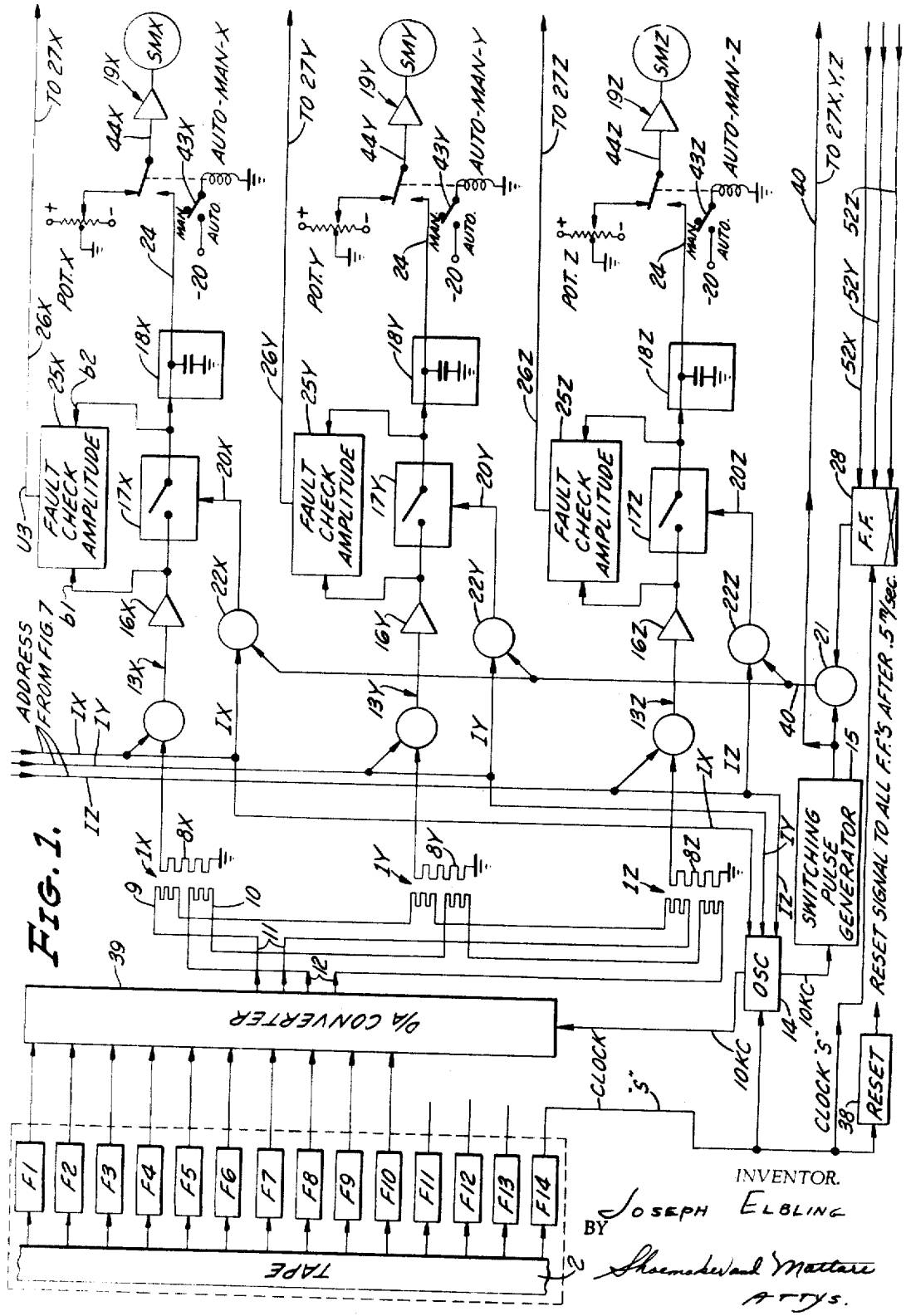

TIMING DIAGRAM
INITIATED BY CLOCK PULSE

INVENTOR.
Joseph Elbling
BY
Shoemaker and Mattare
Attys

| COLUMN 1 | COLUMN 2 | COLUMN 3 | COLUMN 4 | COLUMN 5 |
|---|---|---|---|---|
| TRACK NO. | VALUE OR FUNCTION | D/A CONVERTOR RELAY | AUXILIARY RELAY | AUXILIARY FUNCTION |
| 1 | $\pi/512$ | PC1 | PS1 | — |
| 2 | $\pi/256$ | PC2 | PS2 | START |
| 3 | $\pi/128$ | PC3 | PS3 | STOP |
| 4 | $\pi/64$ | PC4 | PS4 | TO BE ALLOCATED |
| 5 | $\pi/32$ | PC5 | PS5 | TO BE ALLOCATED |
| 6 | $\pi/16$ | PC6 | PS6 | TO BE ALLOCATED |
| 7 | $\pi/8$ | PC7 | PS7 | COOLANT |
| 8 | NOT USED | — | — | — |
| 9 | $\pi/4$ | PC8 | PS8 | — |
| 10 | $\pi/2$ | PC9 | PS9 | SPINDLE |
| 11 | $\pi$ | PC10 | PS10 | TO BE ALLOCATED |
| 12 | 1° ⎫ | — | — | — |
| 13 | 2° ⎬ ADDRESS | — | — | — |
| 14 | 3° ⎭ | — | — | — |
| 15 | PARITY | — | — | — |
| 16 | CLOCK | — | — | — |

FIG. 4.

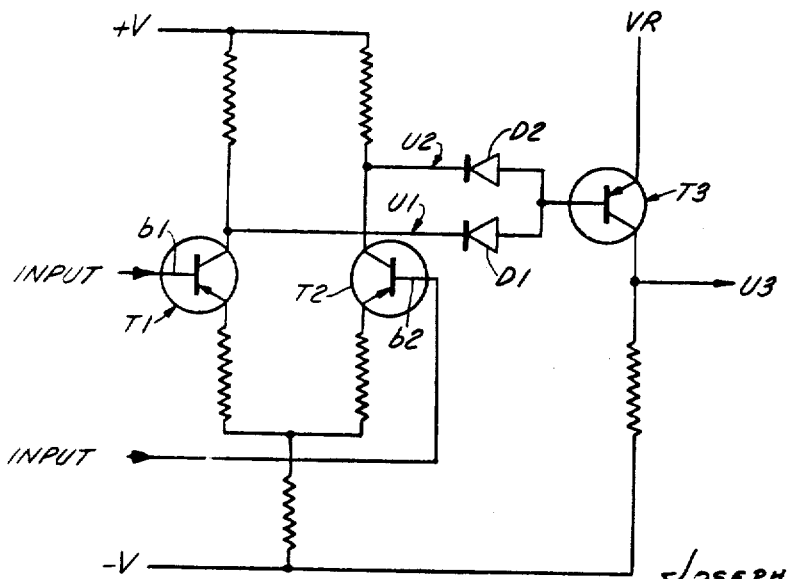

FIG. 3.

INVENTOR.
Joseph Elbling (PART I)

Dec. 5, 1967  J. ELBLING  3,356,994
POSITIONING NUMERICAL CONTROL DEVICE FOR
MACHINE TOOLS AND SIMILAR EQUIPMENTS
Filed Oct. 2, 1964  10 Sheets-Sheet 5

(PART II)

[RESISTORS 67, 68, 69, 70 = 8000 Ω EACH]
[RESISTORS 71, 72 = 39000 Ω EACH]

$\overline{F_1} + F_2 \cdot \overline{F_2} + F_1$

| COLUMN 1 | COLUMN 2 |
|---|---|
| TRACK NO. | VALUE OR FUNCTION |
| 1 | $\pi/512$ |
| 2 | $\pi/256$ |
| 3 | $\pi/128$ |
| 4 | $\pi/64$ |
| 5 | $\pi/32$ |
| 6 | $\pi/16$ |
| 7 | $\pi/8$ |
| 8 | NOT USED |
| 9 | $\pi/4$ |
| 10 | $\pi/2$ |
| 11 | $\pi$ |
| 12 | ADDRESS 1 |
| 13 | ADDRESS 2 |
| 14 | NOT USED |
| 15 | PARITY |
| 16 | CLOCK |

INVENTOR.
JOSEPH ELBLING
BY
Shoemaker and Mattare
ATTYS.

Dec. 5, 1967  J. ELBLING  3,356,994
POSITIONING NUMERICAL CONTROL DEVICE FOR
MACHINE TOOLS AND SIMILAR EQUIPMENTS
Filed Oct. 2, 1964  10 Sheets-Sheet 10

$P_N = F_N + \overline{F_N}$

INVENTOR.
JOSEPH ELBLING
BY
Shoemaker and Mattare
ATTYS.

United States Patent Office 3,356,994
Patented Dec. 5, 1967

3,356,994
POSITIONING NUMERICAL CONTROL DEVICE FOR MACHINE TOOLS AND SIMILAR EQUIPMENTS
Joseph Elbling, Ivrea, Italy, assignor to Ing. C. Olivetti & C., S.p.A., Ivrea, Italy, a corporation of Italy
Filed Oct. 2, 1964, Ser. No. 400,987
Claims priority, application Italy, Oct. 7, 1963, 20,853/63; Mar. 12, 1964, 23,899/64; Apr. 7, 1964, 7,519/64
14 Claims. (Cl. 340—172.5)

ABSTRACT OF THE DISCLOSURE

In a positioning control device for machine-tools, provided with means for reading a program tape and with a digital-to-analog converter fed by said reading means and feeding a position sensing device, a memory condenser is apt to feed a servo-motor for positioning the movable member of the machine-tool in the relevant direction, said memory condenser being fed by the error signal supplied by said position sensing device through a switch operated by the switching pulses issued by an oscillator, which is controlled by clock pulse signals read out of said program tape.

The invention described herein refers to a positioning numerical control device for machine tools or similar equipments, where a movable component is positioned by a servomotor or equivalent actuating device controlled by a series of successive orders for example, in binary form, issued from a programming attachment and representing subsequent positions of the movable component along a predetermined, continuous trajectory.

An object of the present invention is to increase the speed with which the command signals are read and to increase the speed and reduce the equipment involved in applying the command signals to the control of the positioning sensing device which controls the servomotor or equivalent device.

Reading speed is accomplished by not serializing the binary commands for one position, as previously proposed, but instead by arranging all binary bits in one command in parallel fashion, transversely of the tape, whereby these bits are read simultaneously, in fact simultaneously with address bits which identify the command as pertaining to a position order or an auxiliary order.

Speed of utilizing the command signal and reduction of equipment are accomplished by reading data for one axis and almost immediately, after 3- to 3.6-millisecond delay, applying it to the position sensing device for controlling the machine prior to reading the data for the next axis from the machine.

A further object of the invention is to improve reliability of operation and prevent confusion if the data processing system should miss a position instruction or two. This is accomplished by assigning a channel on the tape for a signal for the clock pulses. This signal occurs once with the commands for each axis. If the data processing system should miss a position or two, the next reading of the tape will identify the correct axis for that reading.

The clock pulse signals are used to start an excitation oscillator, to generate signals which allow the error channels to operate only during the clock pulse, and to generate a reset pulse to return all flip flops to zero and to cause the oscillator to stop.

Others have proposed a system of synchronization which is complicated and involved because of the serialization of bits in the command signals and the lack of address identification on the tape. According to this prior proposal, delay circuits and counters are used to cause serialization and to count bits of information, so that the data processing system might know when all information for one axis has been read, and thus transfer this information for processing, and in addition transfer the reading system to the next axis.

According to the present invention, on the other hand, positive synchronization is built in as the clock pulse appears directly on the tape as well as the axis identification (address). Thus, there is minimum chance for the data processing system to become confused for, if it should miss a position or two, the next reading of the tape will identify the correct axis for that reading rather than depend upon the known and built-in sequence on the tape as proposed by others.

Concerning tool radius correction, complications are avoided by adding the necessary corrections to the commands by an independent computer, there being no tool radius correction information on the tape other than the positional commands.

In the digital-analog converter, use is made of precision voltage ratio transformers as described and claimed in U.S. Patent 3,098,990 issued July 23, 1963 to C. L. Farrand and H. J. Hasbrouck, assignors to Inductosyn Corporation.

Provision is made for sampling successive axes with time sharing of all parts of the data processing system, switching axes on the output side (or Inductosyn scale) of the position sensing or data elements. The input sides (Inductosyn sliders) of the data elements for all axes are connected in series to the computer and they receive all commands.

Another object of the invention is to repeat any stop position on the tape even though the tape is not operating. This is accomplished by the use of fictitious addresses. This facilitates the set up of the machine in the first instance and minimizes the effort required to start again should a failure occur. The fictitious addresses insure that a "sine zero" is applied to all axes, which of course occurs every cycle of the data element here shown as Inductosyn. These "sine zero" bits are also the commands at which every stop position is designed.

In other devices of this kind, the stoppage of a machine entails a substantial loss of time because, as a rule, the tool must then be returned to the starting point of the tape. The present invention allows the start to occur at any "start" or "stop" point on the tape at the operator's discretion. This is possible as the invention has provisions for allowing manual control to take over the operation of the machine without loss of any positional orders on the tape. In manual operation, a generator, called Fictitious Address operates to imitate the "start" or "stop" commands from the tape. These positional commands consist of similar predetermined information, and are usually repeatable for the entire length and breadth of the machine in steps of either 2 mm., 10 mm., 0.1", 0.2" or any other dimensions dependent upon the choice of data elements.

To avoid this occurrence, in some known devices there is provided a comparison between the present position of the movable component and the position corresponding to the new order given; the machine tool stops operating if the difference between the two positions is found to be too great.

However, the stopping of the machine, besides the danger of a damaging of the workpiece, entails also a substantial loss of time because, as a rule, after a stop the tool must be returned to the starting point of the profile to be cut, so that the machining must be recommenced.

Therefore, in the above mentioned known devices, a stop being provided on each wrong order, the machining ultimately proves exceedingly long and expensive.

According to a further feature of the invention, each and every new order for a discreet position originating from the programming attachment is compared with the order for a discreet position that then controls the servomotor, the new order being either sent to replace the old one in the control, or ignored, depending on whether the difference between the positions corresponding to said two orders is below a predetermined limit or not.

This fault amplitude checking feature provides the additional advantage of allowing the operator to choose the tolerances to which a part will be made. Whereas one might expect the tolerances to be pre-determined, and the tapes processed to function with the overall system representing the best possible attainable accuracy, this invention permits operation at various degrees of performance. The advantage in cost reduction and manufacturing then will be appreciated if it is understood that an operator may at will choose to make a rough part with, say, a tolerance of 0.005" one time and then another time with a tolerance of, say, 0.0001". This is achieved by the operator adjusting the fault checking circuit to a predetermined limit.

According to a further feature of the invention, a means for stopping the machine is provided should dangerous conditions arise or accidental occurrences cause the part being made to exceed its accuracy tolerances. This feature consists of a fault number and frequency checking circuit, which both counts and measures the frequency of occurrences of each "ignored" order. When the total number and/or the frequency of such "ignored" orders reach a pre-determined value, which can also be adjusted by the operator over a wide range, the machine is caused to stop.

The existing error signal is stored in a memory type condenser supplying a voltage to operate the servomotor. The speed of the servomotor is proportional to the voltage charged on the condenser. Thus the speed and hence the acceleration of the servomotor can be varied by selecting the command voltage input to the data elements. While the charge built on the memory condenser depends on the output of the excitation generator and on the error signal, the voltage of the condenser is the sole voltage input for the servomotor, and even in the absence of the clock pulse and oscillator output, and in the absence of a position command on the tape, the servomotor would continue to run under control of the existing voltage on the condenser until such time as the condenser charge leaks to a small value or zero. Hence, if some command inputs are missed, the servomotor continues to run and if the new position command is not widely different from the one represented by the charge on the condenser, the new command will be restored to find that the servomotor has continued to run and is substantially at the speed and position where it would have been if no command inputs had been lost.

The invention also provides for removal of the excitation voltage from the digital-analog converter during switching, so that switching is accomplished without the high speed relays making or breaking any current, thus prolonging the lives of the relays.

This and other characteristics of the invention will be clearly understood on reading the following description of a preferred type of construction, given merely by way of example and without any aim at a restriction, with reference to the enclosed drawings, where:

FIG. 1 shows a block type diagram of the positioning circuits of the device according to the invention;

FIG. 3 shows a differential circuit used in the device illustrated in FIG. 1 for the fault amplitude checker.

FIG. 4 shows the identification of tracks on the tape, the corresponding digital signals, and their uses.

Figure 7:
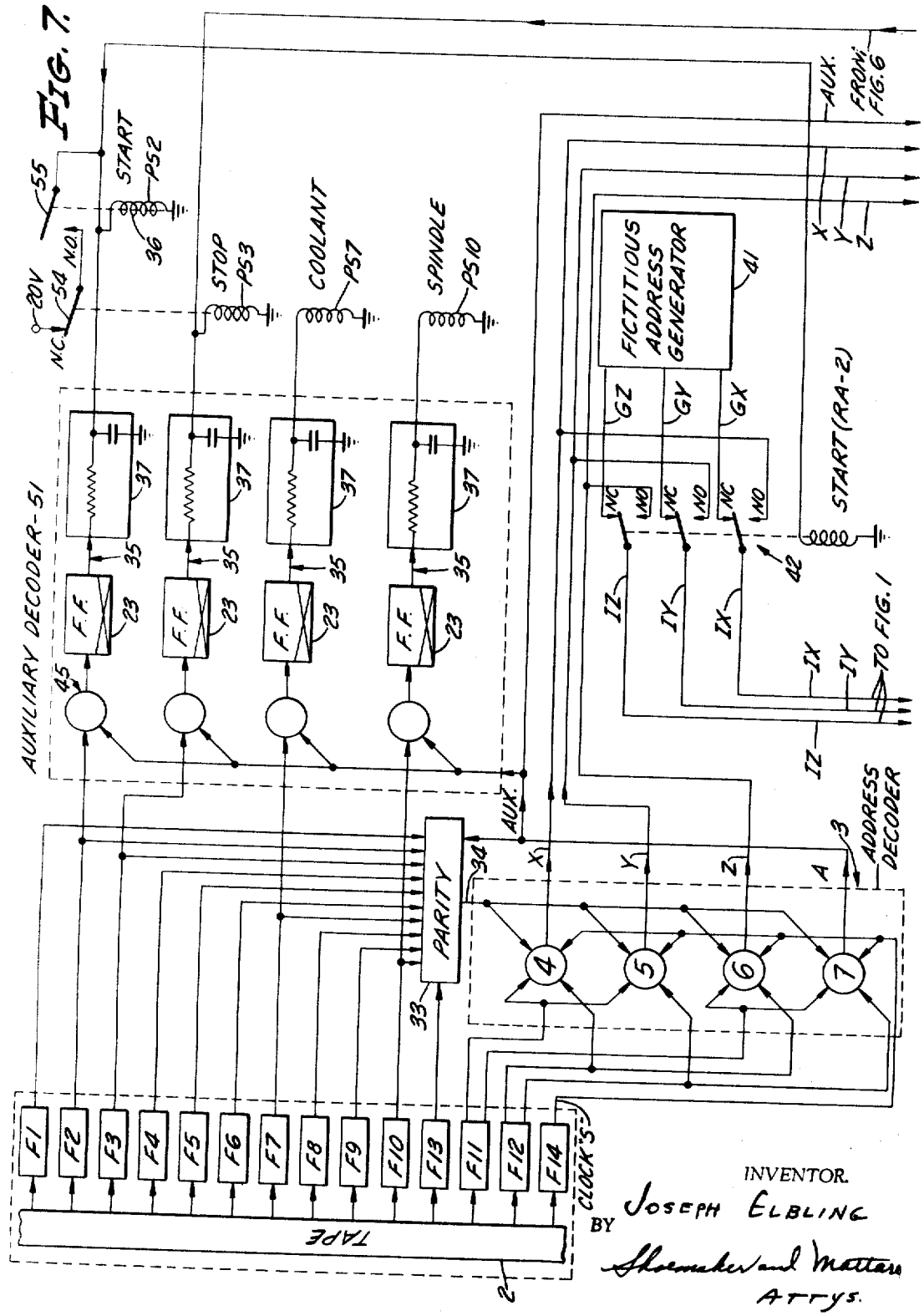

FIG. 7 shows the functional operation of the auxiliary decoder, fictitious address generator, parity check, and address decoder of the device according to the invention; (note: tape and tape-pulse flip flops are shown also in FIG. 1). Some features of the positioning device hereinafter described are described and claimed in copending patent application S.N. 400,986 filed Oct. 2, 1964 in the name of Joseph Elbling and assigned to the same assignee.

According to the construction illustrated in FIG. 1, the device is adapted to control a machine-tool fitted with a fixed tool and with a table movable along three axes (X, Y, Z) under the control of three servomotors (SMX, SMY and SMZ). Furthermore, the machine is adapted to receive auxiliary orders for carrying out auxiliary operations, such as the control of the lubrication, the change of the speed, FIG. 7, etc. The positioning and auxiliary orders are given to the machine by a programming attachment, e.g. a magnetic tape 2 containing 14 tracks, i.e., 13 information tracks and 1 synchronization track.

A different number of tracks on the tape may be chosen. As in an alternative embodiment of this invention, 16 tracks were utilized for a tape one inch wide allowing as many as 15 information and one synchronization track. One extra track was used for the reading of addresses so that in this embodiment a total of 8 addresses is provided by the 3 bits available for this purpose. This is in contrast to the 4 addresses in the first embodiment, FIG. 4.

Figure 2A:
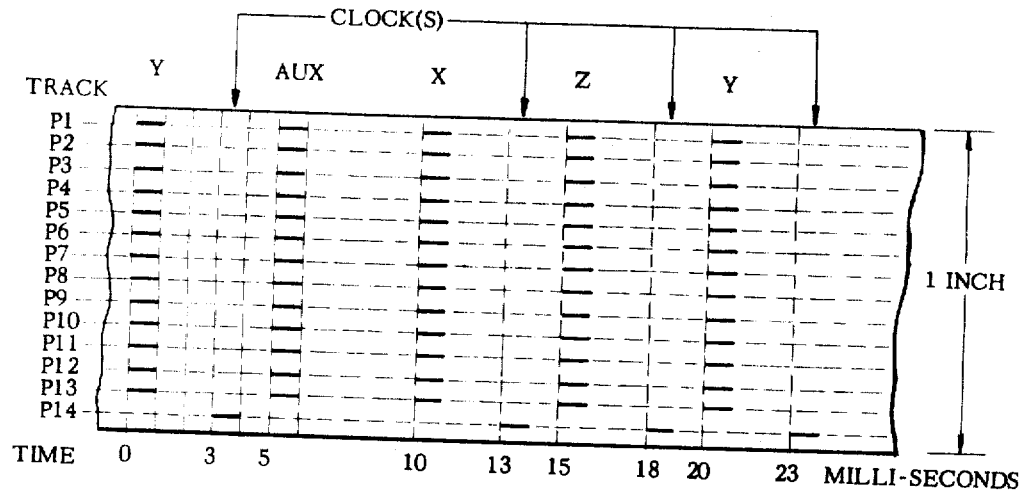
FIG. 2A shows the location of the digital signals on the magnetic tape in the device illustrated in FIG. 1.

In each group of 13 bits recorded on the tape, FIG. 2A, perpendicular to its direction of feed, the first 10 bits are recorded on tracks P1 to P10 respectively, and represent a position order exhibiting the coordinate of a point to be reached by the movable component of the machine along a given axis, or may represent an auxiliary order; 2 bits, recorded on tracks P11 and P12 respectively, indicate the address of the said order, i.e. and show whether it is a positioning order relating to axis X, Y or Z, or whether it is an auxiliary order. A last bit, recorded on track P13 is a parity control bit, chosen so that the total number of bits equal to "1" in the group of 13 bits examined is always an odd number.

In view of the structure of the information on tape and of the plurality of the number of axes to be checked, it has been found opportune to adopt a checking system of the "sampled variables" type.

Each tape row is a sample of one of the variables.

In the present system there are controlled three translational or rotary motions defined by three coordinates (linear or angular) X, Y, Z; furthermore, it is possible to perform, always with tape control, some auxiliary operations such as the automatic change of the tools, starting of the spindle rotation, coolant control, etc.

The necessary channels of information are, therefore, four (FIG. 2A);

- Axis y (Y)
- Auxiliary functions (AUX)
- Axis x (X)
- Axis z (Z)

They are set up on the magnetic tape, and the relative rows are recorded in a definite sequence (in the present instance Y, AUX, X, Z) according to the method of allocation in the time.

Each row must, therefore, be provided with an address which, as already said, is formed by the two address bits. During normal operation each row read is directed to the appropriate channel according to the address.

If N is the number of rows recorded per inch of tape and if V is the running speed of the tape in inches/sec., 1/NV is the recording period; 4/NV is the sampling period-interval of time elapsing between subsequent rows of the same address.

The rows P1 to P10 relating to the auxiliary functions are addressed in appropriate registers F1 to F10, FIG. 7, which control the excitation of relays like 36 arranged for activating electric control circuits for stop, start, coolant, etc., whereas the rows relating to axes X, Y, Z are converted to analogue form by the D/A converter 39 which supplies a pair of sinusoidal oscillations (sine and cosine), see also FIG. 4.

It should be noted that the oscillator 14 is enabled to oscillate only in the presence of one of the addresses IX, IY, or IZ, as shown in FIG. 1.

Figure 5:
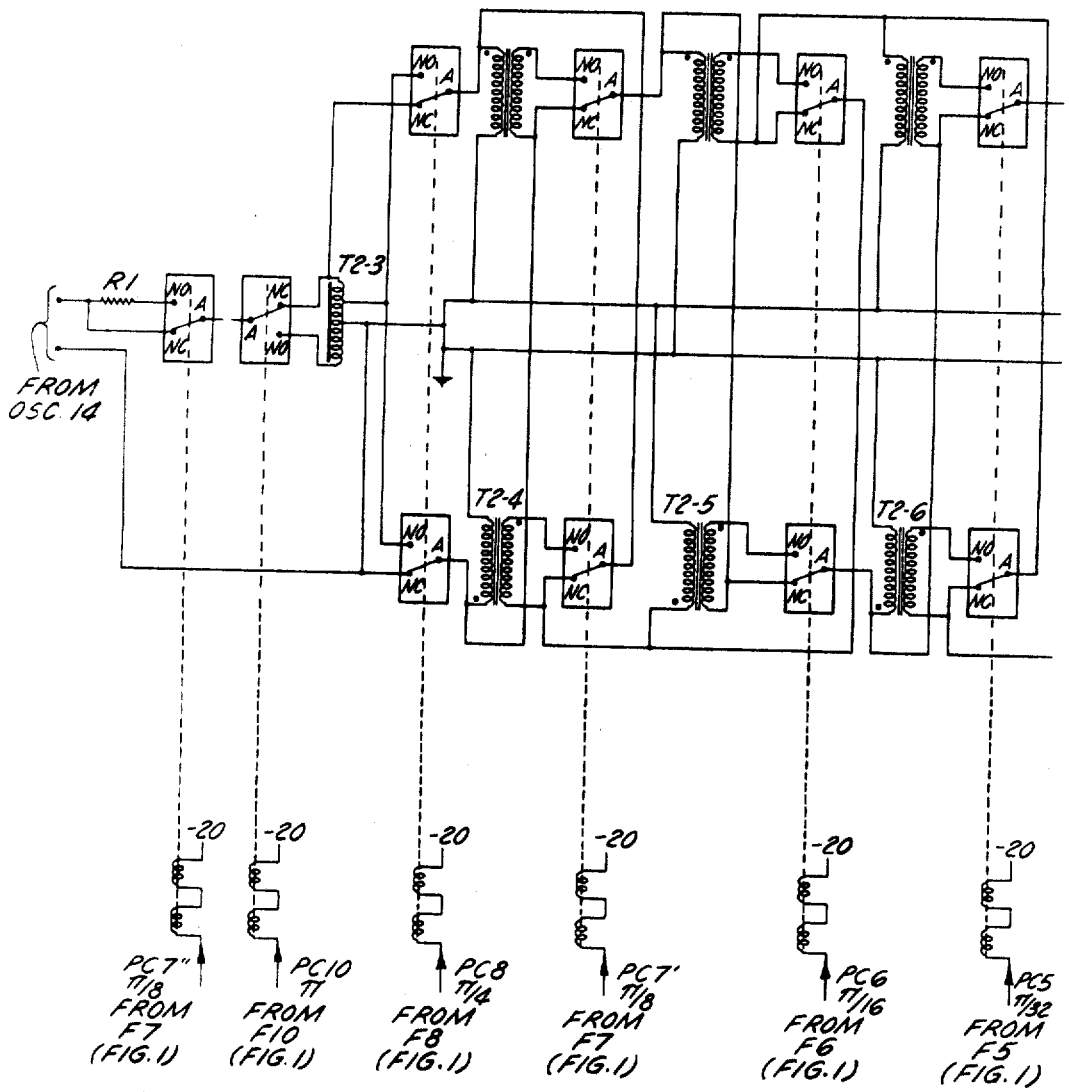
FIG. 5 shows the digital to analog converter (D/A) in detail of the device illustrated in FIG. 1.
Figure 5:
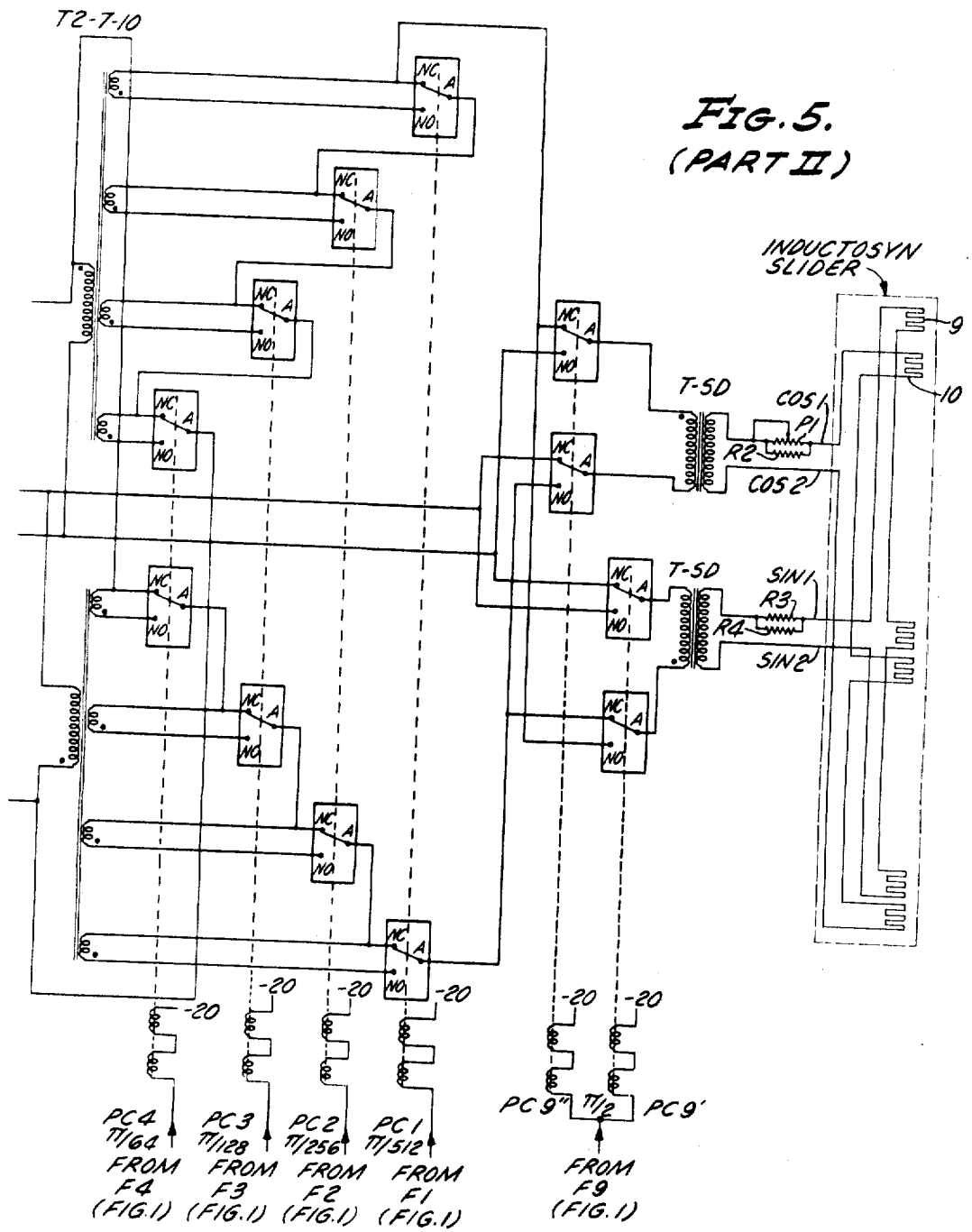

Therefore, since the oscillator is off in the presence of address AUX, although the contacts of the PC relays of the conversion network FIG. 5, are positioned either open or closed, the sine 9 and cosine 10 outlets of the converter 39 remain at zero.

Now, let us consider the error signal 13 (FIGS. 1 and 2B); on the outlet 13 of the position sensing device or Inductosyn 1, it is still in sampled form and consists for each sample, of a train of sinusoidal waves, the amplitude and phase of which determine respectively how much and on which side the system is displaced from the desired position.

It should be noted whereas reference is made to certain numbers such as 13, 16, etc., it is implied that the reference is to the item 13X, 13Y, 13Z; 16X, 16Y, 16Z for the pertinent axis X, Y or Z; the axis designation being omitted for brevity.

Note, for this purpose, on each axis there are provided a sampling switch 17 and a memory condenser 18.

The closing of the switch 17, appropriately timed, makes possible the loading of the memory condenser 18 at the peak value of the error signal 13, with positive or negative polarity according to the phase of the error itself (usually evaluated with respect to the oscillator 14).

The closing of the sampling switch 17 relating to an axis is conditional on the presence of the address of said axis and is controlled by a switching pulse on line 40.

This pulse 40, rectangular and positive, lasting approximately 10 microseconds, which is generated as the oscillator voltage passes through zero in an increasing sense, by the switching pulse generator 15.

Figure 2B:
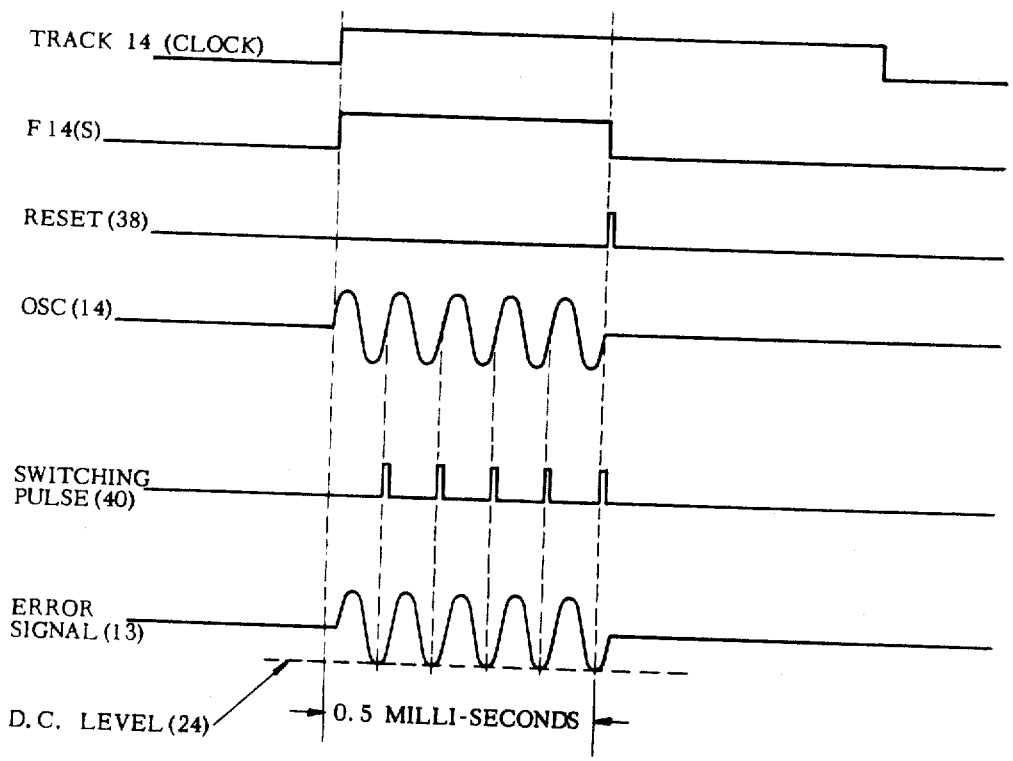
FIG. 2B shows the progress in the time of some signals present in the device illustrated in FIG. 1.

In this manner, the switching pulse 40 is timed on the oscillator 14. It has been seen that the error signal 13 is dephased, with respect to the oscillation frequency of the oscillator 14, by a delay angle equal to $$\frac{\pi}{2} \pm \pi = \pm \frac{\pi}{2}$$

see FIG. 2B.

Therefore this pulse 40 is exactly centered on the peaks (on those having a well-defined polarity) of the error signal; on the positive or negative peaks, according to whether the system is displaced on one or the other side with respect to the desired position. Therefore, for each clock signal F14 there is a train of five pulses 40 during which the selected sampling switch 17 is closed, thereby making possible the charging of the memory condenser 18.

In the intervals between a sample and the successive one, the memory condenser 18 acts as a "holding device" and keeps its charge 24 (FIG. 2B) practically unchanged and equal to the peak value of the preceding sample.

It should be borne in mind that the sampling switch 17 relating to an axis acts only if it is selected by the respective address. There is, in fact, to be considered the following:

For each controlled axis there is obviously a position sensing device 1, the excitation of the sine 9 and cosine 10 circuits of the sliders of the three Inductosyn position sensing devices 1 is, however, common (series or parallel), inasmuch as it obviously originated from the sine 9 and cosine 10 outlets of one of the same converter 39.

Therefore it happens that during X commands, for instance, the sine and cosine functions relating thereto are applied also to the Inductosyns of axes Y and Z.

Of the error signals 13, then present on the outlets of the three Inductosyns, only the one relating to axis X is of significance, inasmuch as it represents the difference between the reference value and the controlled value of one and the same variable X; on the contrary, the errors shown simultaneously on the outlets of Inductosyns Y and Z are of no significance, because they are made up by the difference between the reference value of coordinate X and the checked value of another variable, respectively Y or Z. However, in view of the foregoing, in this case only sampling switch 17X is actuated, so that the spurious signals appearing on the outlets of Inductosyns Y and Z do not produce any effect.

In FIG. 4, the alignment of the information on the tape is shown, Column 1 lists the track identification numbers from 1 to 16 indicating that the tracks are positioned along the 1" dimension of the tape in ⅟₁₆" intervals. The second column of FIG. 4 shows the functions assigned to each track on the tape. The third column of FIG. 4 shows the identification number of each PC relay located also in FIG. 5 which is energized by the digital signal on the magnetic tape. Columns 4 and 5 of FIG. 4 identify the power relays PS2, 3, 7 and 10, see FIG. 7, and the functions used only during the auxiliary commands and a few typical functions, of the many available, are shown.

Note that FIG. 4 identifies the tracks used for the alternative embodiment of this invention when 16 tracks are used, in a different arrangement from the first embodiment. Thus in this invention the tape is not limited to any particular arrangement since all of the necessary information for each position command, including the clock "S" (or synchronization pulse), and the axis address, are all on one parallel line of the tape and read simultaneously by the reading heads. The assigned identification of the tape tracks can also vary from embodiment to embodiment. The clock bit "S," or pulse, may occur on the tape in a place retarded from the other bits on the other tracks, FIG. 2A. This position of the clock pulse amounts to a 3 millisecond delay from the receipt of the information on the other tracks. This delay, however, is not great enough to cause the clock pulse to occur when any other axis or auxiliary function information is being read on the tape, as this information occurs in steps of 5 milliseconds each. Therefore, the positional information for one axis and the clock pulse for this same axis occur before the information for the next axis.

The information for each axis, including the corresponding clock pulse, occurs substantially in one parallel line on the tape. Information for each axis and auxiliaries follow each other on succeeding parallel lines of the tape (as for example Y, then AUX, then X, then Z).

By means of the address decoder 3, each parallel line is directed to the appropriate channel, X, Y, Z or AUX, FIG. 7.

There are to be distinguished three systems of addresses:

| | |
|---|---|
| .–a) Fictitious addresses | GY |
| | GX |
| | GZ |
| .–b) Tape addresses | Y |
| | (AUX) |
| | X |
| | Z |
| .–c) Sampling addresses | IY |
| | IX |
| | IZ |

(A) The fictitious addresses are supplied by the appropriate "fictitious address generator" 41, which operates uninterruptedly, therefore being always available, FIG. 7. They are connected with three N.C. (normally closed) contacts of the start relay 42 (auxiliary function F2); with the respectively corresponding N.O. (normally open) contacts connected to the addresses X, Y, Z of the system, FIG. 7.

The fictitious addresses GX, GY, GZ, by enabling the sampling, serve the purpose of keeping the system under control (in the "electrical zero" position) under those operating conditions where the tape addresses are missing, i.e.:

(1) When the magnetic tape is at a standstill.
(2) When the magnetic tape is in motion, but the "start" signal has not yet been read.

(B) The tape addresses are obtained by address decoder 3, from the tape, the pair of bits F11 and F12 reserved for the address. Their formation, however, is conditional on the parity check 33; if the parity of a row is wrong, the formation of the corresponding address does not take place.

ADDRESSES (a) Y, X, Z connected with 3 N.O. contacts of the start relay 42, serve directly to select the fault number and frequency checking circuits for each axis via gates 27X, 27Y, 27Z.

(b) (AUX). It conditions the memorizing of the auxiliary function commands in the relative registers F1 to F10, FIG. 7, via gates like 45, for each auxiliary command.

(c) The sampling addresses IY, IX, IZ depending on whether the start relay 42 is de-energized or energized, coincide respectively with the fictitious addresses GX, GY, GZ, or with the tape addresses X, Y, Z.

Utilization of IY, IX, IZ;

(1) Starting of the oscillator 14, FIG. 1;
(2) activating the error amplifiers 16;
(3) selection of sampling switches 17.

The 13 bits of each group read by a reader not shown of tape 2 on tracks P1 to P13 are stored in 13 flip-flops F1 to F13. The outlets of flip-flops F11 and F12, which, as already stated, represent an address, feed a decoder of addresses 3, comprising four "AND" circuits 4, 5, 6 and 7 and activate one of the four outlets X, Y, Z, A, according to whether the order then read and rendered stored on flip-flops F1 to F10 refers to axis X, to axis Y, to axis Z or to the auxiliary controls. The outlets of flip-flops F1 to F10 feed a digital analogue converter 39 common to the three axes and give an analogue representation of said order simultaneously with 3 position sensing devices 1X, 1Y and 1Z corresponding to axes X, Y, Z respectively. Each of said position sensing devices 1 may be of the type described in U.S.A. Patent No. 2,799,835 and comprising a fixed multipolar winding 8, as well as a pair of movable windings 9 and 10, fixed to the movable portion of the machine tool. The position of the movable portion with respect to the fixed portion may then be represented by means of the relative displacement between the fixed winding and the movable windings, expressed as an angle in electric degrees, bearing in mind, that the pole pitch of fixed winding 8, equal to 360 electric degrees, is equivalent to say 2 mm. The digital-to-analog converter 39 is of the type described in copending patent application S.N. 437,370 filed March 5, 1965 in the name of Joseph Elbling and assigned to the same assignee. Said converter 39, activated by a sinusoidal oscillator 14, frequency 10 kc., will supply, on outlet 11, which feeds movable winding 9, a sinusoidal signal, frequency 10 kc., maximum amplitude proportional to the sine of said angle, and on outlet 12, which feeds movable winding 10, a sinusoidal signal, frequency 10 kc., and maximum amplitude proportional to the cosine of said angle.

It should be noted in FIG. 5, relays identified as P.C. 1, P.C. 2, etc., through P.C. 10 are the same as those shown in the 3rd column of FIG. 4 and, therefore, operated from the information on the track of the tape. These relays are individually associated with binary transformers T2-3, T2-4, T2-5, T2-6, T2-7-10. The secondary windings of these transformers are designed to supply a voltage output proportional to the voltage on their primary sides by certain binary parts of a cycle in accordance with column 2, FIG. 4. For example, relay P.C. 6 has a secondary containing winding ratio to its primary so that the sine and cosine level obtained are correct for 11¼° (angle π/16). Likewise, the other relays in this network are designed to provide sine and cosine values relative to binary parts of a cycle ranging from π (180°) to π/512 (360°/1024). The network, therefore, is capable of deriving sine and cosine values for binary parts of a cycle without the aid of additional decoding mechanisms.

On outlet 13X of position sensing device 1X, there is then obtained a sinusoidal signal, frequency 10 kc., maximum amplitude proportional to the difference between the present position of the movable portion of the machine to which are attached slider windings like 9 and 10, along axis X and the position represented by the order now stored on flip-flops F1 to F10, in 90° phase relation to the signal of said oscillator according to the sign of said difference, see FIG. 2B.

The 90° phase relationship between the oscillator 14 and this outlet 13 is the result of the characteristic of the Inductosyn data elments. This characteristic simplifies the following circuits as it is desirable to utilize the voltage levels of the peak amplitude of the error signal 13 which coincides with the switching pulses 40 described below, as they are formed at the zero voltage occurrence of the oscillator 14.

The switching pulses 40 are formed by squaring circuit (15) exactly as the oscillator voltage passes zero level in a positive ascending direction. Therefore, there are five such switching pulses 40 during each 5-cycle period of the oscillator 14, and approximately of 10 microseconds duration each. They are therefore coincident with the peak amplitude of the Inductosyn error signals 13 due to the 90° phase shift described above.

Similar signals are obtained for axis Y and axis Z on outlets 13Y and 13Z respectively. Said signals, amplified by amplifiers 16X and 16Y and 16Z respectively, are transferred, through switches 17X, 17Y and 17Z to condenser type analogue memories 18X, 18Y and 18Z, to retain the maximum amplitude of said signals, in order to feed, through amplifiers 19X, 19Y and 19Z servomotors SMX, SMY and SMZ. Each switch, 17X, 17Y, 17Z is of an essentially known type and will be closed so as to establish, between amplifiers 16X, 16Y, 16Z and memories 18X, 18Y, 18Z, a negligible path of impedance throughout the time during which a switching pulse 40 is present on the outlets (20X, 20Y, 20Z respectively), of gates 22X, 22Y, 22Z.

Approximately 3 milliseconds after the reading of a group of 13 signals of information there is read, on track P14, a synchronism signal S (clock), FIGS. 2A and 2B. This, stored on flip-flop F14, starts oscillator 14 which, after performing 5 complete oscillations (FIG. 2B) stops automatically in an essentially known manner.

This 3 millisecond delay is sufficient time to allow the P.C. relays in the D/A converter 39 to have reached their correct position. Therefore, it is seen that these relays operate without the excitation voltage being applied to the transformers of the D/A converter 39 essentially with no current in the transformer windings and therefore none through the relay contacts, see FIG. 5. Likewise, since the oscillator is on for only 5 cycles (or a 0.5 millisecond at 10 kc.), and since the next axis of information does not appear on the tape 2 except in 5 millisecond intervals, it can be seen that the P.C. relays in the D/A converter will not operate again until after the oscillator has stopped.

Therefore, these P.C. relays are energized prior to the D/A converter 39 receiving excitation voltage, and de-energized or re-energized again after the voltage has ceased, so that at no time do the contacts of the relays make or break when there is current through them.

Besides converter D/A, oscillator 14 feeds a squaring circuit 15, adapted to produce a switching pulse on line 40 each time oscillator 14 passes through zero in an ascending direction, see FIG. 2B. Said switching pulses 40 are used for the selective closing of sampling switches 17X, 17Y, 17Z. More specifically, the switching pulses 40, after going through a gate 21, the function of which will be explained farther on, are sent to switch 17X, 17Y or 17Z depending on whether the order now stored on flip-flops F1 to F10 is a position order relating to axis X, Y or Z. For this purpose, the inlets 20X, 20Y, 20Z of the switches are connected with circuit 15 through gates 22X, 22Y, 22Z, opened respectively by signals IX, IY, IZ, obtained from decoder of addresses 3. If the order stored in flip-flops F1 to F10 is an auxiliary order, none of the gates 22X, 22Y, 22Z is opened, and the order, through a gate 45 allowed to do so by address signal A, controls the auxiliary functions of the machine, via flip-flop 23 and integrating circuit 37 of auxiliary decoder 51.

Referring now to FIG. 4, the 4th and 5th columns indicate the relays and auxiliary functions assigned respectively to each of 10 tracks on the tape.

It should be noted that these tracks P1 to P10 are the same tracks as used for positional commands; advantage being taken of the fact that the call for an auxiliary is an address independent of the call for an axis, and occurs sequentially on the tape in the same fashion as the axis information, but also in parallel form across one width of the tape. Actually, column 5 shows only 4 auxiliary commands. However, since 10 tracks are available, it is theoretically possible to command as many as 1024 auxiliary functions. A simple binary decoder could perform this task. However, the usual embodiments of this invention do not require more than 10 auxiliary functions.

It is therefore clear that, following the reading of a position order relating to a given axis, there is opened only the sampling switch 17 relating to said axis, and that said switch 17 is opened only against the peaks of outgoing signal 13 of the corresponding position sensing device 1 (FIGS. 1 and 2), so that the corresponding condenser type memory 18 is charged at a voltage level, denoted by 24 in FIG. 2B, equal to the maximum amplitude of said outgoing signal 13 and, therefore, at a level representing the present value of the error along said axis.

This level, which is proportional to the error along an axis, is stored in the condenser memory 18 and remains until changed for 50 or more axis commands. This level 24, remaining constant, provides a constant voltage to the input of the servo amplifiers 19 causing the servo motor SMX, SMY, SMZ to drive the machine at a constant velocity. In the case of electric systems, tachometer feedback (not shown) is supplied so that constant velocity is maintained. When a new positional command reaches this memory condenser 18, the charge level of this condenser is changed to the new level proportional to positional error, which then causes the machine to change its velocity in proportion to this new level. Thus the machine responds in the direction of the new position at a velocity proportional to the positional error and continues at this velocity until a new positional error level is stored in the condenser.

Furthermore, since the axis under control starts at a velocity proportional to the condenser level, it continues to do so while the commands for other axes or the auxiliary commands are being processed, since the charge on the memory condenser 18 is the only voltage which controls the machine during these times (in the absence of any change to the condenser level 24). The nature of the timing of information for one axis as it occurs on the tape therefore makes is possible to understand that a second positional command would be different from the first positional command by an amount to make it coincide with the place where the machine will be when that command is read, plus the additional distance desired by the designer to call for the correct velocity. This illustrates the fact that distances between commands can be any value depending upon the velocity desired and the velocity obtained. It is theoretically possible to have steps greater even than one cycle of the position sensing device, as this positional command would be computed to be read at the time when the machine has driven to its new position due to the nature of the constant level on the charging condenser.

A change in the level 24 of the memory condenser 18 represents a change in velocity of the machine and therefore acceleration. If the machine is capable of there-accelerations it will respond correspondingly. The processor of the magnetic tape, being familiar with the characteristics of the machine in its ability to accelerate, can control the distances between subsequent positional commands.

As appears from the above dscription, since all the bits relating to each axis or to each auxiliary order are recorded in parallel arrangement on the tape, then treated in parallel arrangement, there are thus eliminated the complicated internal synchronization and parallelization structures, based on the employ of scaling type registers, which are required in similar known devices controlling machine tools.

Furthermore, according to an important characteristic of this invention, the above mentioned arrangement of the bits on the tape makes possible the feeding of the machine tool with a tape read in either direction, so as to obtain different profiles with the same programming tape.

According to a characteristic of the invention, after the reading of a new order, the closing of sampling switch 17X, 17Y or 17Z of the corresponding axis is moreover conditional on the result of the comparison between the position error signal 24 stored in the condenser type memory (18X, 18Y, 18Z respectively) and the error signal 13 corresponding to said new error, so that the position error signal 13 corresponding to the new order is sent to the memory to replace the old one 24 only if it does not differ too much from the old one. If, instead, the difference is exceedingly great, so that, in view of the continuity of the profile cut by the machine tool, the new order is likely to be wrong, then the order in question is ignored, and the servomotor of the corresponding axis continues to be controlled by the voltage due to the charge stored in the condenser type memory 18X, 18Y, 18Z on the basis of the last order deemed to be acceptable. This is made possible by the fact that the subsequent position orders recorded on the tape represent points very near to one another of the profile to be cut.

For carrying out said comparison there is provided, for each axis, a fault amplitude checking circuit, 25X, 25Y, 25Z, with two inlets connected with the two poles of switch 17X, 17Y or 17Z which supply a signal on outlet 26X, 26Y or 26Z, throughout the time during which the difference between the signals on the two inlets exceeds a predetermined value.

The predetermined value is adjustable by the operator over a convenient range as explained in connection with FIG. 3. This allows the operator to establish the tolerance to which the part will be made in accordance with the requirements of the design. It also allows him to align the system prior to operation which gives him the further advantage of being able to adjust on the spot for minor variations in performance of the various circuits and structures. In addition, it gives him the facility of running through a program for instance, in a fairly rough fashion (by increasing the acceptance tolerances) for a review of overall operation prior to actual use.

Figure 6:
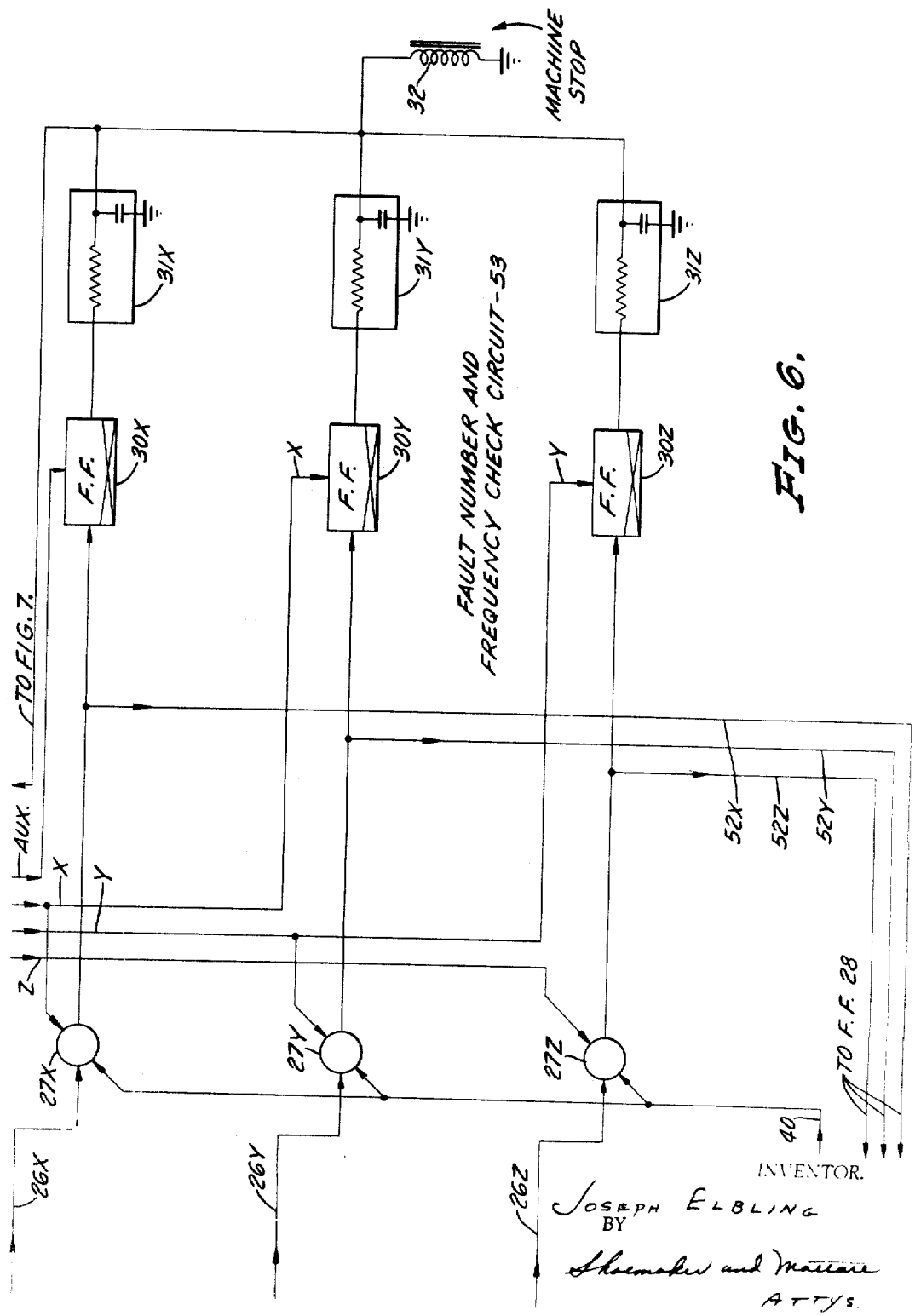
FIG. 6 shows the functional operation of the fault number and frequency check circuit of the device according to the invention.

The signals produced by fault amplitude checking circuits 25X, 25Y, 25Z, FIG. 1, are sent, through gates 27X, 27Y, 27Z, FIG. 6, to de-activate a flip-flop 28, FIG. 1, via line 52 which is activated by each clock impulse S.

When activated, flip-flop 28 keeps open gate 21, through which are sent the switching pulses 40 that control the closing of the sampling switches 17, on line 20X, 20Y, 20Z via gates 22X, 22Y, 22Z.

As shown in FIG. 6, the opening of the gates 27X, 27Y, 27Z is conditional on the presence of address signals X, Y, Z, so that the outlet 26 of each fault checking circuit 25 is used only when there is present, in flip-flops F1 to F10 an order relating to the corresponding axis. Furthermore, said gates are opened only in the presence of switching pulses 40 produced by switching pulse generator 15, i.e., only against the peaks of sinusoidal outgoing signals 13 of the position sensing devices 1 (FIG. 2B).

It is, therefore, clear that the fault amplitude checking circuit 25 compares the amplitude of the signal stored in the condenser type memories 18 with the maximum amplitude of the outgoing error signal 13 of the position sensing devices 1 which, as already said, represent the position error corresponding to the order now read and stored on flip-flops F1 to F10.

Moreover, the device according to the invention is fitted with a fault number and frequency checking circuit 53 capable of stopping the machine if, during any sequence of $n$ consecutive orders relating to a given axis, the number of orders ignored because wrong exceeds a predetermined number $k$.

As will be seen, the total number of orders to be ignored and the frequency of their occurrence is also a variable and under the control of the operator. At will he can adjust so that in the case of extremely close tolerances, he would decrease the numbers of orders and their frequency to a minimum, or in the case of rough machining operation, they would be adjustable to a maximum in the same fashion.

More specifically, on each axis X, Y, Z, there is provided (FIG. 6) a flip-flop 30X, 30Y, 30Z, which is de-activated immediately before the reading of each position order relating to said axis; since the address signals follow one another cyclically, as already explained, this can be obtained by causing flip-flop 30X, 30Y, or 30Z to be deactivated by address signal A, X or Y as shown in FIGS. 6 and 7. On the other hand, each flip-flop 30X, 30Y, 30Z is activated by the possible fault signal 26 coming from gate 27X, 27Y or 27Z of the corresponding axis. Therefore, with reference e.g. to axis X, flip-flop 30X will remain deactivated during the reading of an order A, and activated during the reading of orders X, Y, and Z, in the event of order X having been deemed unacceptable; it will, instead, remain deactivated during the reading of all four orders A, X, Y, Z if order X will have been deemed acceptable. Flip-flops 30Y and 30Z will operate in a similar manner. Each flip-flop 30X, 30Y, 30Z feeds an integrating circuit 31X, 31Y or 31Z, comprising a condenser which is charged when the outlet of the corresponding flip-flop 30 is activated, and is discharged when said outlet is deactivated, and a threshold circuit capable of supplying, on the outlet of the integrating circuit, a signal when the charge level of the condenser exceeds a predetermined value.

By adjusting the values of the threshold voltage, the predetermined value is changed thus affording a selection for the operator of a multiple of levels.

The constants of the charge and discharge times of the condenser are chosen so that said threshold level is exceeded only when, in a sequence of $n$ consecutive orders, the number of error signals exceeds a predetermined number $k$.

The outlets of integrating circuits 31X, 31Y and 31Z control an electromagnet 32, which controls the stopping of the machine. The generation of each address signal X, Y, Z, A in generator 3, FIG. 7, is, furthermore, conditional on the parity check-up 33 carried out on the group of bits to which said address signal refers, FIG. 7.

More specifically, the outlets of flip-flops F1 to F13 feed a parity check-up circuit 33 (essentially known) which, on outlet 34, supplies an assent signal to the activation of outlets X, Y, Z, A of "And" circuits 4, 5, 6 and 7 only if the number of bits equal to "1" among the thirteen numbers read on the tape and stored in said flip-flops is odd. Consequently, every position, or auxiliary order, that presents a parity error is automatically ignored, because the lack of the corresponding address signal X, Y, Z or A, prevents the closing of switches 17X, 17Y, 17Z, respectively and the activation of the decoder of auxiliary orders 51.

One track of the magnetic tape is reserved for the parity bit. When it is prepared, the tape is adjusted so that, in each transverse row, the number of bits of "1" present turns out to be odd, the clock bit "S" being excluded from the count, in view of its peculiar timing (it is, in fact, delayed by 3 msec. with respect to the other type bits), the presence of the parity bit makes possible the check-up of accuracy of the reading, row by row.

An appropriate logical network 33, with the employ of the input memorizing flip-flops, supplies a parity signal $p$ against each row. When said signal takes the logical value "1," the conversion of the row to an analogue signal is inhibited; the row of information is lost, as will be explained farther on.

From the operating point of view, the parity check network is a "block" with 26 inputs and 1 output. The inputs are fed by the outputs directly from the memorizing flip-flops F1 to F13 of the tape bits, excluding the clock-bit.

It should be noted that the exclusion of the clock-bit "S" from the parity check does not impair the efficiency of the check; in view of the logical function of the clock-bit, a row that is without it is forthwith lost.

Parity circuit 33 operates as follows:

The output is signal $\bar{p}$.

The cases: $\bar{p}=0$ and $\bar{p}=1$ correspond to normality and error respectively.

The parity network is obtained by means of 4 logic levels.

The quartets of bits formed at the second logic level will turn out to be:

(1, 2, 3, 4); (5, 6, 7, 8); (9, 10, 11, 12)

and the pair 13, 14 (fictitious) which, to all effects and purposes, can be assimilated to a "quartet."

At the third logic level, always by the same method, there is obtained the oddness of the number of 1's present respectively in the following groups of bits:

(1, 2, 3, 4, 5, 6, 7, 8); (9, 10, 11, 12, 13, 14).

thus obtaining respectively the following signals:

P1 to 8, $\overline{P1\ to\ 8}$, P9 to 14, $\overline{P9\ to\ 14}$.

From these, at the fourth logic level, are obtained $p$ and $\bar{p}$ (useful output of the check network).

Output $\bar{p}$ of the check network is used for conditioning the formation of the four addresses; Y, AUX, X, Z.

In case of error, $\bar{p}$ takes value 1 and inhibits the formation of the address; failing the address, the sampling does not take place.

Each outlet 35 of flip-flop 23, FIG. 7, feeds the corresponding control mechanism of the auxiliary function, e.g. an electromagnet 36, through an integrating circuit 37, essentially known, so that part 36 is activated only if the corresponding auxiliary order has been repeated at least a predetermined number of times. The outgoing signal of flip-flop F14, delayed by a delaying mechanism 38, is furthermore used for resetting flip-flops F1 to F14, FIG. 1.

The operation of the positioning numerical control device is briefly described hereunder:

Assuming all the flip-flops to have been initially deactivated, and the tape to have been put in motion, reader of tape 2, FIG. 1, reads the first group of bits, which is assumed to be relative, e.g., to axis X. Said bits are stored in flip-flops F1 to F13. Consequently, outlet X of address decoder 3 is activated, provided parity circuit 33 permits it. There are subsequently opened gates 27X, FIG. 6, and 22x, FIG. 1.

Approximately 3 milliseconds later clock pulses are read so that flip-flop F14 is activated.

Thereupon, oscillator 14 starts and, consequently, the outlets of converter D/A are activated. Fault amplitude checking circuit 25X compares continuously the signal issuing from amplifier 16X with the signal present on memory condenser 18X at the inlet of servomotor amplifier 19X. Furthermore, flip-flop 28 is activated, in case it has not yet been activated, FIG. 1.

Against the first peak of the 10 kc. error signal squaring circuit 15 imparts the first switching pulse 40 which, if the outlet of fault checking circuit 25X is not correctly activated at that moment, does not activate the outlet of gate 27X and, therefore, does not activate flip-flop 28. Consequently, gate 21 remains open, and the same switching 20X is sent to close momentarily switch 17X, so that the position error signal then supplied by position sensing device 1X, is transferred to memory 18X, to replace the previous one in order to control servomotor SMX.

Flip-flop 28 having been left activated, also the four successive switching pulses 20 produced by squaring circuit 15 are similarly sent to close momentarily switch 17X, so that the position error signal produced by position sensing device 1X is repeatedly sent to memory 18X, so as to complete the memory condenser charge up to the new voltage level.

When the five oscillation periods of oscillator 14 are completed, the same synchronism signal S or clock pulse, delayed by circuit 38, zeroes flip-flops F1 to F14 to prepare the device for the reading of the subsequent order.

Each fault amplitude checking circuit, 25X, 25Y, 25Z, comprises (FIG. 3) an essentially known differential amplifier, consisting of two transistors T1 and T2, with emitter in common, to whose base terminals b1 and b2 are sent, appropriately amplified, the two signals to be compared. On outlet terminals U1 and U2 there is obtained as is well known, voltage depending on the difference between the amplitude of the two input signals b1 and b2.

As long as outlets U1 and U2 exhibit a potential equal to, or higher than, a potential VR, at which is permanently kept the emitter of a transistor T3—which happens when the two input signals b1 and b2 do not differ too much from each other—transistor T3 is restrained, so that the potential of outlet U3 is near to —V.

If, instead, the signal present on terminal b1 is considerably higher or lower than the signal on terminal b2, then outlet U1, or U2, changes over to a potential considerably lower than VR, so that, through diode D1, or D2, there passes into transistor T3 a base current sufficient to bring the transistor into conduction, and outlet U3 rises to a potential near to VR.

MODES OF OPERATION

The positional numerical control device operates as follows:

(A) *By hand* (manual control)
(B) *Automatically* (automatic control)
The automatic control includes two cases:
(B–1) operation with fictitious addresses
(B–2) operation with addresses from tape (program control).

The selection of the automatic/manual mode of operation is independent for each of the controlled axes X, Y, Z and is made by exciting respectively the relays, FIG. 1: Auto-man Y; auto-man X; auto-man Z.

Manual Control

Reference is here made to any one axis, e.g. Y. When axis Y is under manual control, the relative Auto-man Y relay is released by opening toggle switch 43Y.

This implies that:

At the input of servo amplifier 19Y there is a continous signal originating from manual control potentiometer POT Y; (memory condenser 18Y is disconnected from the servoamplifier).

Potentiometer POT Y serves the purpose of controlling the *speed* of the motor SMY.

Automatic Control

When axis Y is under automatic control, the corresponding relay, Auto-man Y, is energized by closing toggle switch 43Y.

In this case:

The input of servo amplifier 19Y is connected with memory condenser 18Y (manual control potentiometer POT Y is disconnected from the input of the servo amplifier 19Y).

In this manner, servo-system Y is set up for normal operation. In the case of the electric motor driven servo control (not shown) the error signal 44Y, which is applied at the input of the servo amplifier 19Y, is the algebraic sum of a position error signal (originating from the Inductosyn and memorized on condenser 18Y) and of a compensation signal (not shown), obtained by elaborating with a compensating network (not shown), the signal supplied by tachometric dynamo, (not shown).

In the case of control with hydraulic servo motor SMY, the tachometric dynamo is absent, and the error signal 44Y present at the input of the servo amplifier represents the position error signal.

In the automatic operation, the control of the axis is therefore entrusted to the Inductosyn 1.

When the unit is controlling automatically, two typical operating phases occur according to whether the control of the system is or is not entrusted to the program recorded on the magnetic tape:

(B–1) operation on fictitious addresses, GX, GY, GZ.
(B–2) control from tape (or "from program").

When a job is commenced, the unit operates at first as under (B–1), then the program takes up the control of the system and the unit operates as under (B–2).

(B–1) *Automatic control: operation on fictitious addresses.* The operation on *fictitious addresses* takes place as an initial phase of each job. At the beginning of a program, the operator must perform the following operations, in the specified sequence:

(1) fit the magnetic tape on the tape unit;
(2) turn on power;
(3) determine the continuous feeds for the control unit. By this operation there is applied, by manual switch not shown, 20 v. to reset the flip-flops that memorize the auxiliary functions. This reset is kept on until the magnetic tape is started;
(4) feed power to the electric or hydraulic servo motors;
(5) start the magnetic tape, then begin its regular reading. When starting the tape, the preliminary reset voltage—20 v.—of the auxiliary function, referred to above, is removed. The first length of magnetic tape (usually 3 meters) is recorded in a particular manner, i.e.:
  (a) all the tracks, with the exception of the clock track, are zeroed.
  (b) on the clock track are, as usual, the regularly recorded clock bits.

Each of these clocks is, therefore, associated with a row 0000000000000, which does not conform to the parity rule. Accordingly, during the reading of the initial length of tape, both the reading and the memorizing flip-flops of the auxiliary functions remain zeroed as;
— the former are certainly zeroed by the clocks,
— the latter have all been zeroed at the time of the application of the power.

Failing the parity consent, the formation of the true addresses Y, AUX, X, Z cannot take place. Therefore, the oscillator 14 could not oscillate if this inconvenience were not obviated by sending to the oscillator some fictitious addresses GX, GY, GZ.

The fictitious addresses from generator 41 are sent to the sampling switches, 17, via relay 42 and gate 22. In this manner, the system is kept under control and shifts, for each axis, to the "electrical zero" position.

The memorizing flip-flops F1 to F10 are always zeroed, and converter D/A supplies Sin $\theta=0$, Cos $\theta=1$, since the PC relays are de-energized.

These conditions define the electrical zero position.

The operation on fictitious addresses is characterized by the non-excitation of a start relay 42 (RA–2) and by means of its N.C. contacts, the fictitious addresses GX, GY, GZ are supplied via IX, IY, IZ to the oscillator 14 and to the sampling switches 17. The start relay 42 remains de-energized, until the start command is read from the tape on track P2.

(B–2) *Automatic control from program.*

The initial zeroed tape length is followed by the recording on P2 of the "start" auxiliary function, FIG. 7, and then comes the recording of the program commands. The "start" is a peculiar feature, having the address of an auxiliary function AUX, and digital signal of 1 alone on track P2. Also, address AUX is present which enables the auxiliary function memorizing flip-flop 23 relating to track 2 of the tape, through gate 45. Said flip-flop 23 controls the excitation of the start relays 36 and 42 through an integrating circuit 37.

Said circuit 37 excites the start relays 36 and 42 only after the consecutive arrival of a predetermined number (generally 8 to 10) of start bits. Said starting relay 36 is held energized until the receipt of a stop command on P3 of the tape, which stop command energizes the stop relay PS3 in the same fashion as previously described for energizing the start relay 36. The start relay 36 contains holding contacts 55 in circuit with stop relay contacts 54, the N.C. contacts of which are connected to a —20 voltage source. When start relay 36 is operated by integrating circuit 37, it remains operated as —20 volts is applied via the N.C. contacts 54 of the stop relay PS3, and the N.O. contacts 55 of the start relay 36. The receipt of a stop command P3, energizes stop relay PS3, opening the —20 volt circuit to start relay 36 via the opening of stop contacts 54. Since start relay 42 is connected in parallel to 36, it operates with start relay 36.

When relay 42 RA2 is excited, the tape addresses IX, IY, IZ (decoded by the address tracks) reach the oscillator 14 and the sampling switches 17, whilst the fictitious addresses GX, GY, GZ are excluded. From this moment the control is entrusted to the program.

With further regard to FIG. 2B, a pulse created by the oscillator voltage crossing zero is in phase with the maximum of the error voltage from the output member 8 of the Inductosyn because the output voltage of the Inductosyn, due to the relatively large resistance in the input winding, is 90° out of phase with the input voltage instead of 180° as in the case of a low resistance input winding. A more detailed description of the operations for initially setting the movable part of the machine tool in a reference position is contained in copending patent application S.N. 444,207 filed March 31, 1965 in the name of Joseph Elbling and assigned to the same assignee.

Figure 8:
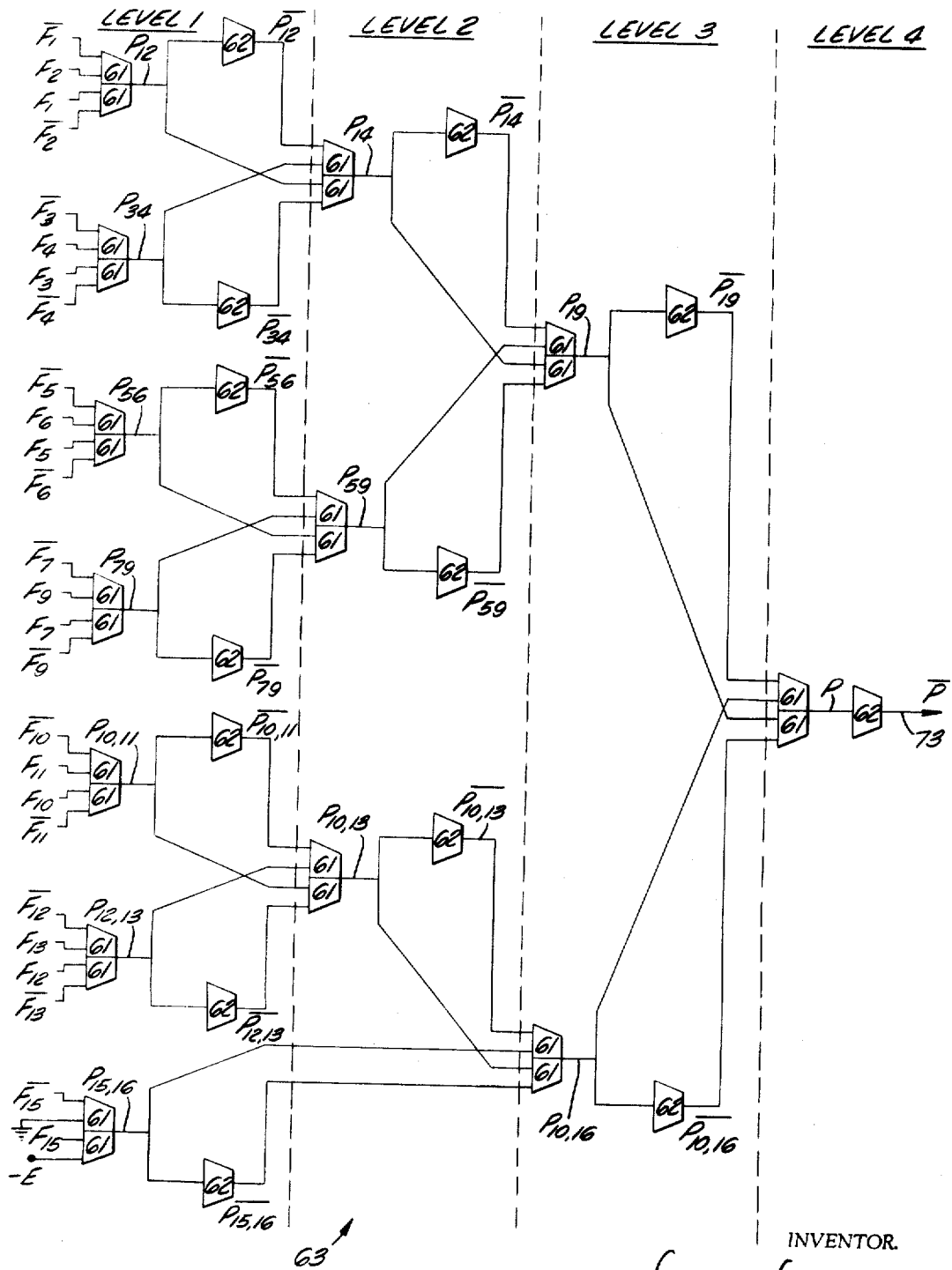

FIG. 8 is a block type diagram representing the complete parity check network 63, showing uses of AND circuits 60, which comprise two NOR 61 and inverter 62.

Figures 9, 11:
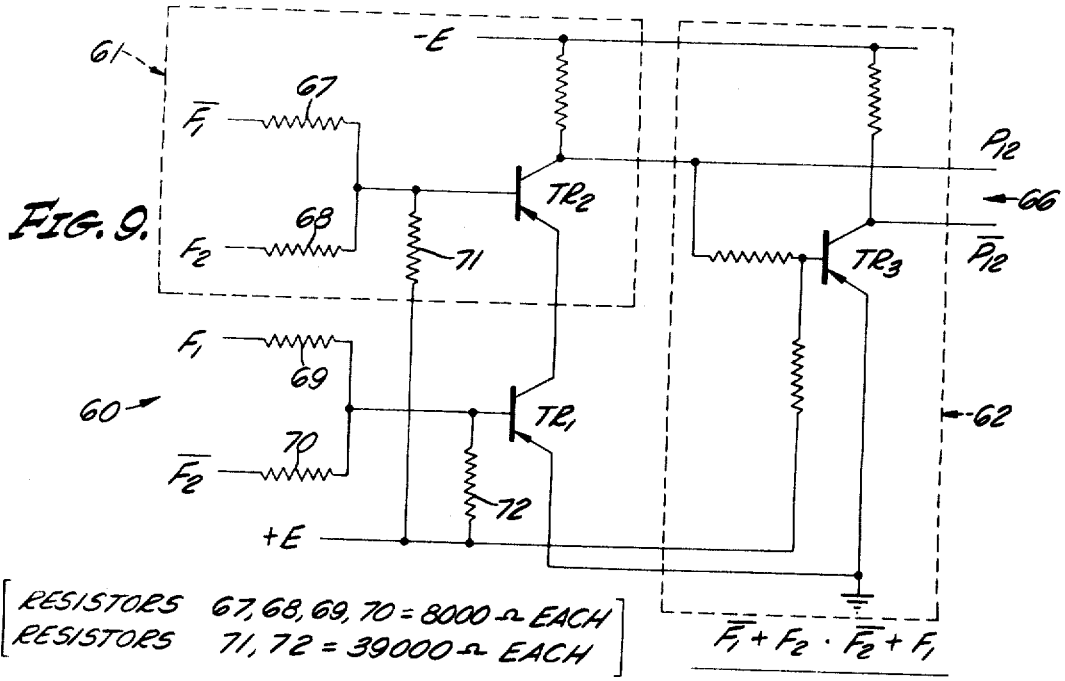

FIG. 9 shows a diagram of an "AND" gate 60, FIG. 8. This gate provides an output only if both the input pairs representing variables are simultaneously applied. It consists of two NOR circuits 61 and inverter 62, producing complementary outputs $P_{12}$ and $\overline{P}_{12}$. This is a typical "NOR logic" circuit using series transistors for an AND gate.

Figure 10:
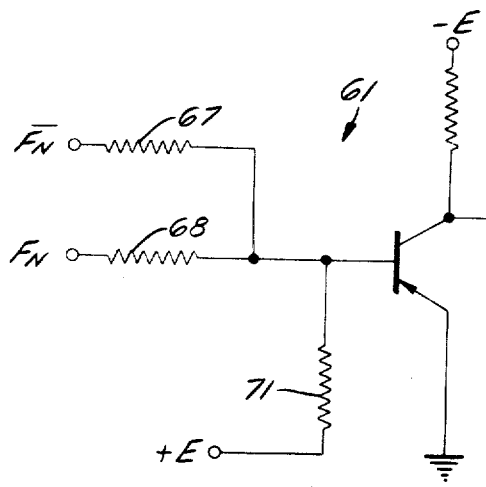

FIG. 10 shows a diagram of a NOR gate 61, FIGS. 8 and 10. This is a gate which provides a complementary output for any one input.

FIG. 11 shows the identification of tracks on the tape, the corresponding digital signals, and their uses.

Figure 12:
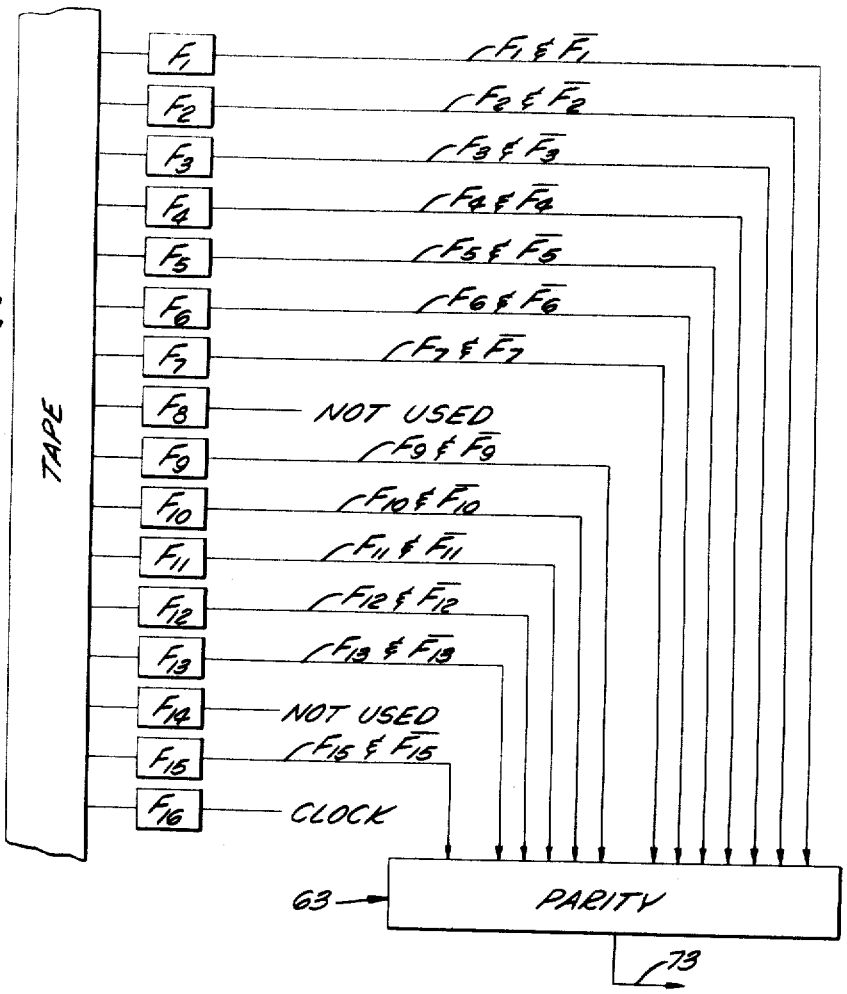

FIG. 12 is a diagram showing that the outputs of the tape reading flip-flops $F_1, F_2 \ldots F_{15}$ are connected as inputs to the parity network 63, FIG. 8. Each output $F_1, F_2 \ldots F_{15}$ actually is comprised of two complementary outputs $F_1, \overline{F}_1, F_2, \overline{F}_2$, etc., shown as one line for simplicity on FIG. 12, but shown in detail in FIG. 8 as two lines. These complementary outputs represent the two possible states of the flip-flops $F_1, F_2 \ldots F_{15}$, and total 26 inputs, since $F_8$ and $F_{14}$ are not used in this embodiment.

Different numbers of tracks on the tape may be chosen. As an alternative embodiment of this invention, 16 tracks were utilized allowing as many as 15 information and one synchronization tracks, and are herein described.

However, track 8 and track 14 are not used. (Refer to FIGS. 11 and 12).

In each group of 13 bits recorded on the tape perpendicular to its direction of feed, the first ten bits are recorded on tracks P1 through P11, (excluding track P8, which is not used) represent a position order for co-ordinate of a point. Two bits recorded on tracks P12 and P13 indicate the address of said order, and show whether it is a positioning order relating to axis X or Y, or whether it is an auxiliary order. Additional addresses could be obtained by utilizing track P14. However, track P14 will be considered unused in this description.

On track P15 is a parity control bit chosen so that the total number of bits in the group of 13 examined is always an odd number.

The block bit is excluded from the count (track P16) because of its timing (it is delayed by 3 to 3.5 msec. with respect to the other bits). The presence of the parity bit makes possible a check on the correctness of each row of pulses appearing in the tracks. An appropriate logical network, utilizing the output of the tape pulse flip-flops ($F_1$ through $F_7$, $F_9$ through $F_{13}$, and $F_{15}$, FIG. 12) supplies an oddness signal for each row. When this signal represents the logical value "1," the conversion of the row to an analogue signal is inhibited. The row is then rejected, as will be explained later.

Generally, the parity circuit is a block with 26 inputs 63, FIGS. 8 and 12, and one output 73. Both conditions of each flip-flop are examined. However, they are shown as one on FIG. 12. Refer to FIG. 8. Track 16 is not used. Ground and —E are applied to simulate the 0 and 1 state respectively. The inputs are the outputs of the memorizing flip-flops $F_1$ through $F_7$; $F_9$ through $F_{13}$ and $F_{15}$ FIG. 12 of the tracks.

It should be noted that the exclusion of the clock bit from the parity check does not impair the efficiency of the check. In view of the logical function of the clock bit, a row that is without it is rejected anyway.

The output 73 of the parity circuit, FIGS. 8 and 12, is a signal $\overline{p}$ (complement of $p$). The convention utilized is: $p=1$ or $p=0$. The case $\overline{p}$ output=0, corresponds to normality (oddness), and output=1, corresponds to error (evenness).

The parity network is composed of 4 logic levels, FIG. 8. At the *first* level, the row bits $F_1, F_2$, etc., are grouped two by two, and, each pair of tracks gives two outputs, one indicating an odd number of bits in the tracks observed, and the other output indicating its complement. This is accomplished by connecting two NOR logic circuits in series, plus an inverter, to form an AND circuit, which generates an output (1 state) when the bits are odd (FIG. 9, output $P_{12}$), and a complementary output (0 state) when the bits are odd (FIG. 9, $\overline{P_{12}}$).

This circuit comprises NOR circuits, utilizing all correct output conditions from the first two bits in a row.

Each logic level determines the oddness of the signals from the preceding logic level.

Refer to FIG. 9:

$\overline{F_1}$=ground when track 1 of tape reads ("1")
$F_2$=−E volts when track 2 of tape reads ("1")
$F_1$=−E volts when track 1 of tape reads ("1")
$\overline{F_2}$=ground when track 2 of tape reads ("1")

The total number of combinations of the two variables:

$F_1 \& F_2$ is $2^n = 4$

| | $F_1$ | $F_2$ |
|---|---|---|
| | 0 | 0 |
| | 1 | 1 |
| (A) | 0 | 1 *odd number of bits |
| (B) | 1 | 0 *odd number of bits |

It can be seen only two combinations represent an odd condition, however, four conditions exist. Looking at (A), the odd condition is satisfied if:

$F_2 = 1$ and $F_1 = 0$
$F_1 = 0$ can be expressed as $\overline{F_1} = 1$
thus $F_2$ and $\overline{F_1} = 1$ also continuing for (B):

$F_1$ and $\overline{F_2} = 1$

The expression for oddness can therefore be expressed as:

$F_1 \cdot \overline{F_2} = 1$ or $F_2 \cdot \overline{F_1} = 1$

If the parity function for oddness of the first two bits in any row is expresed as $P_{12}$, then in the complete expression $P_{12} = F_1 \cdot \overline{F_2} + F_2 \cdot \overline{F_1}$ represents the odd number of bits present in the pair of bits on the first and second track in the tape.

It will be noted that with the above expression two AND gates and an OR gate are required. Since the circuit consists of "NOR logic," the expression is converted utilizing two NOR gates and an inverter combined to form an AND gate. (Less transistors are required for the NOR equivalent circuit.)

$P_{12} = F_1 \cdot \overline{F_2} + F_2 \cdot \overline{F_1}$
$\overline{P_{12}} = \underbrace{\overline{F_1} + F_2} \cdot \underbrace{\overline{F_2} + F_1}$
$\qquad\quad\text{or}\qquad\text{or}$
$\qquad\qquad\underbrace{\qquad\qquad\qquad\qquad}_{\text{and}}$ In FIG. 9, the OR signal is delivered through the resistors 67, 68, 69, 70, 71, 72. The NOR determination is performed by transistors $TR_1$ and $TR_2$ and the inversion caused by $TR_1$ and $TR_2$ necessarily make these NOR gates. The series combination of $TR_1$ and $TR_2$ form an AND gate with transistor $TR_3$ providing the phase inversion. Note that both complementary outputs are obtained.

Therefore, in consideration of the foregoing, $P_{12}$, FIG. 8, is an output of an oddness circuit, whose inputs are $\overline{F_1}$, $F_2$ and $F_1$, $\overline{F_2}$, respectively (each variable like $F_1$, has two modes, $F_1$ and $\overline{F_1}$).

The complement output is $\overline{P_{12}}$ indicating the complementary state (0) of oddness.

Thus, for each pair of bits there is available a pair of signals $P_{mn}$, $\overline{P_{mn}}$, which indicates its oddness.

At the second logic level (FIG. 8) there are obtained oddness signals from the combination of four input variables, similarly to the first logic level. The output of the first pair of variables gives $P_{12}$ and $\overline{P_{12}}$ as seen above. The output of the second pair of variables gives $P_{34}$ and $\overline{P_{34}}$ through the use of another AND gate. Oddness of the four variables (each having two modes) is determined by applying $P_{12}$, $\overline{P_{12}}$, $P_{34}$ and $\overline{P_{34}}$, to the second logic level having another AND gate, that is two NOR's and an inverter. The second level input expression is as follows:

$P_{14} = P_{12} \cdot \overline{P_{34}} + \overline{P_{12}} \cdot P_{34}$ or $\overline{P_{14}} = \underbrace{\overline{P_{12}} + P_{34}} \cdot \underbrace{P_{12} + \overline{P_{34}}}$
$\qquad\qquad\qquad\qquad\qquad\qquad\text{or}\qquad\text{or}$
$\qquad\qquad\qquad\qquad\qquad\qquad\underbrace{\qquad\qquad\qquad}_{\text{and}}$ $\overline{P_{14}} = P_{14}$ plus inversion The parity function of each group for bits in any row in the second logic level has inputs from the first level resulting in outputs as indicated.

$P_{14} = P_{14}$ plus inversion $\overline{P_{69}} = \overline{P_{56}} + P_{79} \cdot P_{56} + \overline{P_{79}}$ $\overline{P_{10,13}} = \overline{P_{10,11}} + P_{12,13} \cdot P_{10,11} + \overline{P_{12,13}}$ The above functions require three NOR's and three inverters. Each of the above functions is obtained as explained above through the utilization of "NOR logic."

Note that both oddness and its complement are used as input parameters for each logic level (previously called modes).

Proceeding as before, the third logic level will have inputs, i.e. from the preceding level, having outputs as indicated.

$\overline{P_{19}} = \overline{P_{14}} + P_{59} \cdot P_{14} + \overline{P_{59}}$ $\overline{P_{10,16}} = \overline{P_{10,13}} + P_{15,16} \cdot P_{10,13} + \overline{P_{15,16}}$ Notice, the above functions resolve evenness and oddness of all the bits in track 1 through 7, and tracks 9 through 13 and 15. (Tracks 8 and 14 are not used and 16 is clock track which is not counted due to its timing.)

The last logic level requires one NOR and one inverter, having inputs from the preceding level resulting in the output $\overline{P}$ as indicated.

$\overline{P} = \overline{P_{19}} + P_{10,16} \cdot P_{19} + \overline{P_{10,16}}$ The output 73, FIG. 8, is applied to address decoder 3 to prevent the activation of an address if the odd parity is non-existent (or explained in specification starting line 3, col. 12).

I claim:

1. In a programmed control system for controlling a machine-tool in at least two directions of movement in dependence on recorded digital program data which comprises in respect to each said direction a sequence of digital numbers in binary notation representing a succession of instantaneous positions spaced along the relevant directions, means for reading said recorded sequence of numbers, a digital-analogue converter having an input from an oscillator controlled by a clock pulse signal on said program for each sequence of said numbers, said converter having a control input having a relay for each digit of the number as read, said converter having elements in circuit with said oscillator, said elements being under control of said relays and providing a supply of sine and cosine values of an angle corresponding to the binary number as read, a position sensing device, a servo-motor for the relevant direction and a memory condenser feeding said servo-motor, said position sensing device having an input of said supply and an error signal output, said oscillator and hence said output having a number of oscillations, said output being an input to a switch having an output leading to said memory condenser for said servo motor, and means for deriving switching impulses operating said switch to transmit said error signal to said condenser.

2. In a programmed control system for controlling a machine tool in at least two directions of movement in dependence or recorded digital program data which comprises in respect to each said direction a sequence of digital numbers in binary notation representing a succession of instantaneous positions spaced along the relevant directions, means for reading said recorded sequences of numbers, a digital-analogue converter having an input from an oscillator controlled by a clock pulse signal on said program for each sequence of said numbers, said converter having a control input having a relay for each digit of the number as read, said converter having elements in circuit with said oscillator, said elements being under control of said relays and providing a supply of sine and cosine values of an angle corresponding to the binary number as read, a position sensing device and servo motor for the relevant direction, said position sensing device having an input of said supply and an error signal output, said oscillator and hence said output having a limited number of sinusoidal oscillations, said output being an input to a switch having an output leading to a memory condenser for said servo motor, and means for deriving from said oscillator a corresponding limited number of switching pulses operating said switch to transmit only the peaks of said error signal to said condenser.

3. In a programmed control system according to claim 2, said switching pulses coinciding in time with the zero crossing of each full wave of said oscillator.

4. In a programmed control system according to claim 2, and a fault amplitude checking device for monitoring the operation of said switch.

5. In a programmed control system according to claim 2, said clock pulse signal starting said oscillator after the number as read, is stored in flip-flops, and means for stopping said oscillator and restoring said flip flops to zero before the next number is presented to said reading means.

6. In a programmed control system according to claim 2, said elements of said converter comprising transformers having connections controlled by said relays.

7. In a programmed control system according to claim 2, and means for delaying activation of said oscillator until after said relays have operated, whereby the contacts of said relays have no current through them until after the contacts are operated.

8. In a programmed control system according to claim 2, the active period of said oscillator terminating before said reading means reads the next number, whereby the oscillator voltage is removed before said relays are operated.

9. In a programmed control system for controlling a machine tool in at least two directions of movement in dependence on recorded digital program data which comprises in respect to each said direction a sequence of digital numbers in binary notation representing either (a) a succession of instantaneous positions spaced along the relevant directions or (b) auxiliary orders, a digital data record on which said sequences of numbers relating to the respective directions of movement or auxiliary orders are recorded, all digits of each such numbers and address digits identifying the number as pertaining to position or auxiliary function appearing in parallel fashion in the same row transversely of the record, means for reading said recorded sequences of numbers; processing equipment including an analog-digital converter and an address decoder connected to the reading means for receiving the respective position and address numbers and processing them for use; means for applying the processed numbers individually for controlling the movements of the machine tool in the relevant directions if the address digits identify the number as pertaining to position and for applying the processed numbers for controlling an auxiliary function if the address digits identify the number as pertaining to an auxiliary order a fictitious address generator operating alternatively to said address decoder, a start relay having normally open contacts in circuit, with the output of said address decoder, said start relay having normally closed contacts in circuit with said fictitious address generator and an input to said controlling means for each direction of movement, and means for operating said start relay.

10. In a programmed control system for controlling a machine tool in at least two directions of movement in dependence on recorded digital program data which comprises in respect to each said direction a sequence of digital numbers in binary notation representing either (a) a succession of instantaneous positions spaced along the relevant directions or (b) auxiliary orders, digital data record on which said sequences of numbers relating to the respective direction of movement or auxiliary orders are recorded, all digits of each such numbers and address digits identifying the number as pertaining to position or auxiliary function appearing in parallel fashion in the same row transversely of the record, each of said rows including a parity bit, means for simultaneously reading the number and address digits of each row, means for processing said sequences of numbers and digits as read, an address decoder having an input of certain data recorded in each row, a parity check circuit having an input of the digital numbers in a row and having an output representing the oddness of the sum of the signal bits equal to "1" in the row, and means whereby said parity check output circuit controls activation of said address decoder.

11. In a programmed control system for controlling a machine tool in at least two directions of movement in dependence on recorded digital program data which comprises in respect to each said direction a sequence of digital numbers in binary notation representing either (a) a succession of instantaneous positions spaced along the relevant directions or (b) auxiliary order, digital data record on which said sequences of numbers relating to the respective direction of movement or auxiliary orders are recorded, all digits of each such numbers and address digits identifying the number as pertaining to position or auxiliary function appearing in parallel fashion in the same row transversely of the record, each of said rows including a parity bit, means for simultaneously reading the number and address digits of each row, means for processing said sequences of numbers and digits as read, a reader, flip-flops for storing the numbers read on said record, an address decoder having an input of certain data recorded in each row, a parity check circuit having an input of the digital numbers in a row and having an output representing the oddness of the sum of the signal bits equal to "1" in the row, and means whereby said parity check output circuit supplies an assent signal to the activation of outlets of said address decoder only if the number of bits equal to "1" among the numbers read on the record and stored in said flip-flops is odd.

12. In a programmed control system for controlling a machine tool in at least two directions of movement in dependence on recorded digital program data which comprises in respect to each said direction a sequence of digital numbers in binary notation representing either (a) a succession of instantaneous positions spaced along the relevant directions or (b) auxiliary orders, digital data record on which said sequence of numbers relating to the respective direction of movement or auxiliary orders are recorded, all digits of each such numbers and address digits identifying the number as pertaining to position or auxiliary function appearing in parallel fashion in the same row transversely of the record, each of said rows including a parity bit, means for simultaneously reading the number and address digits of each row, means for processing said sequence of numbers and digits as read, an address decoder having an input of certain data recorded in each row, a parity check circuit having an input of the digital numbers in a row and having an output representinng the oddness of the sum of the signal bits equal to "1" on the row, and means whereby said parity check output circuit controls activation of said address decoder so that every position, or auxiliary order, that presents a parity error is automatically ignored, the lack of the corresponding address signal pertaining to a particular axis, or to auxiliary order, preventing the closing of corresponding switches, respectively, and the activation of a decoder of said auxiliary orders.

13. A machine tool control system having a tape running at constant speed, the tape having successive rows of binary bits in code representing position of a machine element with provision for a parity bit, if needed, so that the sum of the "1's" in each row is the same, a reader to simultaneously read each row, means for translating the code, as read, into movement of said machine element, and a parity check circuit having an input of said code and controlling said translating means for skipping a row if the sum of the "1's" of the row is incorrect.

14. In a programmed control system for controlling a machine tool in at least two directions of movement in dependence on recorded digitial program data which comprises in respect to each said direction a sequence of digital numbers in binary notation representing either (a) a succession of instantaneous positions spaced along the relevant directions or (b) auxiliary orders, a digital data record on which said sequences of numbers relating to the respective directions of movement or auxiliary orders are recorded, all digits of each such numbers and address digits identifying the number as pertaining to position or auxiliary function appearing in parallel fashion in the same row transversely of the record, means for reading said recorded sequences of numbers; processing equipment including an analog-digital converter and an order decoder connected to the reading means for receiving the respective position and address numbers and processing them for use; and means for applying the processed numbers individually for controlling the movements of the machine tool in the relevant directions if the address digits identify the number as pertaining to position and for applying the processed numbers for controlling an auxiliary function if the address digits identify the number as pertaining to an auxiliary order, in combination with a fictitious address generator which is operative when said order decoder is idle to supply an error current corresponding to electrical zero to the controlling means for the relevant direction.

References Cited

UNITED STATES PATENTS

| | | | |
|---|---|---|---|
| 3,093,781 | 6/1963 | Anke et al. | 235—151.11 |
| 3,099,781 | 7/1963 | Herchenroeder | 235—151.11 |
| 3,204,132 | 8/1965 | Benaglio et al. | 235—151.11 |
| 3,246,129 | 4/1960 | McKelvie | 235—151.11 |
| 3,286,085 | 11/1966 | Rado | 340—172.5 |
| 3,287,545 | 11/1966 | Burnett et al. | 235—151.11 |

ROBERT C. BAILEY, *Primary Examiner.*

G. D. SHAW, *Assistant Examiner.*